United States Patent
Cano Ceron et al.

(10) Patent No.: US 11,704,360 B2
(45) Date of Patent: Jul. 18, 2023

(54) APPARATUS AND METHOD FOR PROVIDING A FINGERPRINT OF AN INPUT SIGNAL

(71) Applicant: Fraunhofer-Gesellschaft zur Förderung der angewandten Forschung e.V., Munich (DE)

(72) Inventors: Estefanía Cano Ceron, Ilmenau (DE); Hanna Lukashevich, Ilmenau (DE); Patrick Kramer, Ilmenau (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/021,806

(22) Filed: Sep. 15, 2020

(65) Prior Publication Data

US 2021/0056136 A1    Feb. 25, 2021

Related U.S. Application Data

(63) Continuation of application No. PCT/EP2019/057408, filed on Mar. 25, 2019.

(30) Foreign Application Priority Data

Mar. 28, 2018 (EP) .................... 18164739

(51) Int. Cl.
*G06F 16/683* (2019.01)
*G10L 19/018* (2013.01)
(Continued)

(52) U.S. Cl.
CPC ........ *G06F 16/683* (2019.01); *G06V 40/1365* (2022.01); *G10L 19/018* (2013.01); *G10L 25/27* (2013.01); *G10L 25/51* (2013.01)

(58) Field of Classification Search
CPC ..... G06V 40/1365; G10L 25/51; G10L 25/27; G10L 19/018; G10L 25/18; G06F 16/683
(Continued)

(56) References Cited

U.S. PATENT DOCUMENTS 9,299,364 B1    3/2016 Pereira et al.
2005/0278171 A1*  12/2005 Suppappola .......... G10L 19/012
                                                                704/227
(Continued)

FOREIGN PATENT DOCUMENTS

WO    2012108975 A2    8/2012

OTHER PUBLICATIONS

Haitsma, J. and Kalker, T., "A Highly Robust Audio Fingerprinting System," 2002. In Proceedings of the 3rd International Society for Music Information Retrieval Conference (ISMIR). Paris, France.
(Continued)

*Primary Examiner* — Melur Ramakrishnaiah
(74) *Attorney, Agent, or Firm* — Perkins Coie LLP; Michael A. Glenn

(57) ABSTRACT

Embodiments provide an apparatus for providing a fingerprint of an input signal, wherein the apparatus is configured to determine intensity values for a plurality of time-frequency regions of the input signal, wherein the apparatus is configured to compare the intensity values associated with different time-frequency regions of the plurality of time-frequency regions, to obtain individual values of the fingerprint based on the comparison of intensity values associated with two time-frequency regions.

18 Claims, 7 Drawing Sheets

(51) Int. Cl.
*G10L 25/27* (2013.01)
*G10L 25/51* (2013.01)
*G06V 40/12* (2022.01)

(58) Field of Classification Search
USPC .......................................................... 700/94
See application file for complete search history.

(56) References Cited

U.S. PATENT DOCUMENTS

| | | | | |
|---|---|---|---|---|
| 2014/0310006 | A1* | 10/2014 | Anguera Miro | G10L 19/002 704/500 |
| 2015/0199974 | A1* | 7/2015 | Bilobrov, I | G10L 25/51 700/94 |
| 2017/0365276 | A1* | 12/2017 | Greene | G10L 25/54 |
| 2019/0139557 | A1* | 5/2019 | Hodgson | G10L 25/51 |

OTHER PUBLICATIONS

Wang, A. L.-C., "An industrial-strength audio search algorithm," 2003. In Proceedings of the 4th International Society tor Music Information Retrieval Conference (ISMIR)., 2003.

Shumeet, B. and Covell, M., "Audio Fingerprinting: Combining computer vision and data-stream processing," 2007. In Proceedings of the IEEE International Conference on Acoustics, Speech and Signal Processing (ICASSP).

Anguera, X., Garzon, A., and Adamek, T., "Mask: Robust Local Features for Audio Fingerprinting," 2012. In IEEE International Conference on Multimedia and Expo.

Sonnleitner, R. and Widmer, G.: "Quad-based Audio Fingerprinting Robust to Time and Frequency Scaling," 2014. In Proceedings of the 17th International Conference on Digital Audio Effects (DAFx-14) Erlangen, Germany.

\* cited by examiner

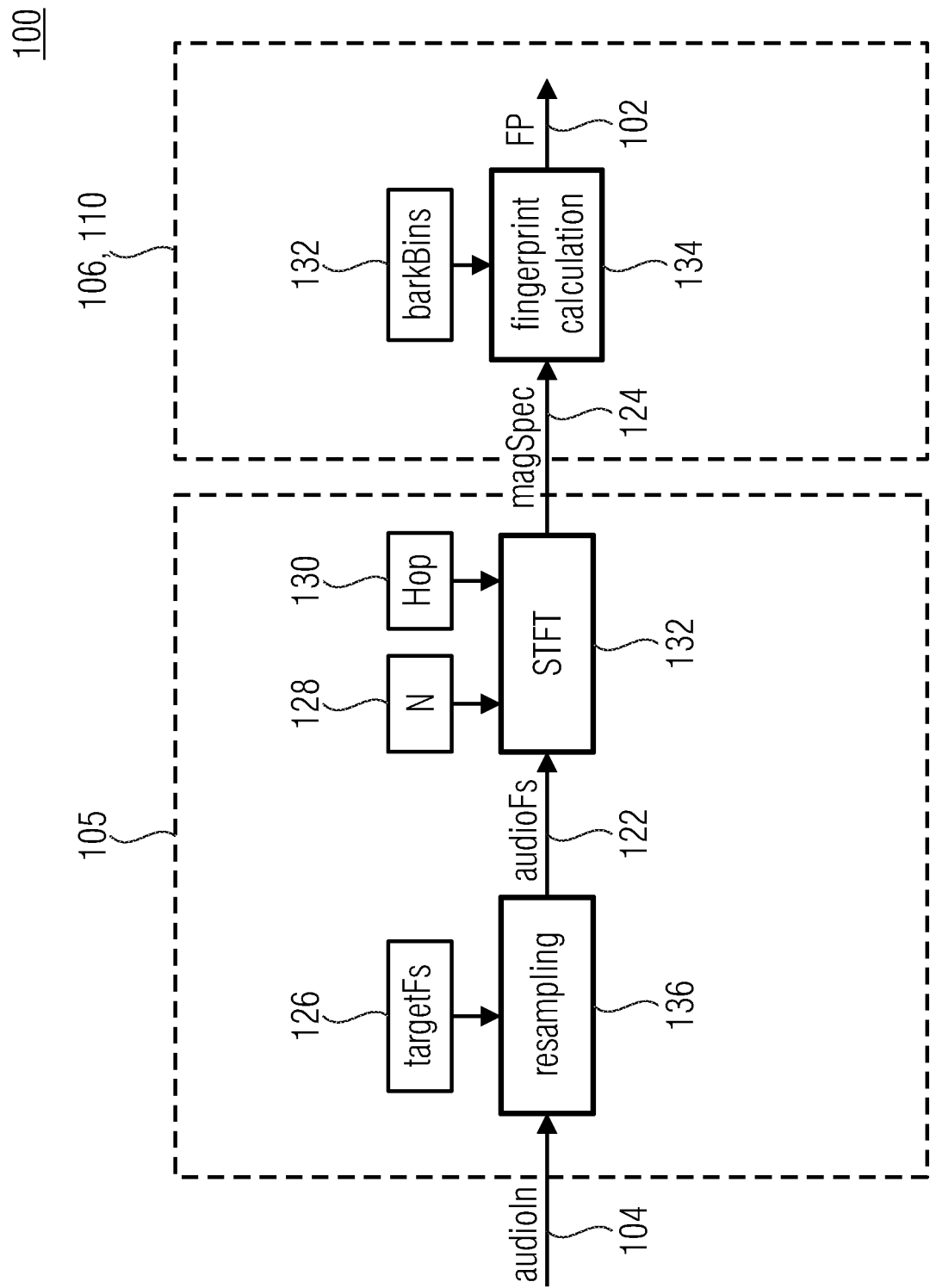

US 11,704,360 B2

APPARATUS AND METHOD FOR PROVIDING A FINGERPRINT OF AN INPUT SIGNAL

CROSS-REFERENCE TO RELATED APPLICATIONS

This application is a continuation of copending International Application No. PCT/EP2019/057408, filed Mar. 25, 2019, which is incorporated herein by reference in its entirety, and additionally claims priority from European Application No. 18164739.7, filed Mar. 28, 2018, which is also incorporated herein by reference in its entirety.

BACKGROUND OF THE INVENTION

Embodiments relate to an apparatus and a corresponding method for providing a fingerprint of an input signal. Further embodiments relate to an apparatus and a corresponding method for matching an input signal with a reference signal. Some embodiments relate to a method for matching of time-domain signals.

Several matching approaches have been proposed in the literature that make use of peak-picking techniques in the magnitude spectrogram [1,2,3]. These methods attempt to find discriminating structures and patterns in the distribution of spectral peaks in the magnitude spectrogram and make use of these structures to distinguish signals. Some approaches have proposed methodologies that are robust to time and frequency scalings [3,4]. This is particularly useful in cases where audio tracks have been pitch-shifted or its tempo has been modified.

Some approaches have based their fingerprint extraction on calculating energy comparison from regions of the magnitude spectrogram, either by using peak-picking strategies [2] or by pre-defining locations in the magnitude spectrogram [5].

Other approaches have attempted to capture the structure of the data by applying Wavelet Transform and encoding the location of the coefficients with the largest magnitudes [6]. As opposed to fingerprints in binary format, this fingerprint uses 2-bits per coefficient to create the fingerprint.

However, the above described matching approaches are sensitive to signal distortions and noise. Furthermore, the above described matching approaches have high demands with respect to processing power.

Therefore, it is the object of the present invention to provide a concept for extracting a fingerprint of an input signal that comprises an improved robustness towards noise and signal distortions, and that entails less processing power.

SUMMARY

An embodiment may have an apparatus for providing a fingerprint of an input signal, wherein the apparatus is configured to determine intensity values for a plurality of time-frequency regions of the input signal, wherein the apparatus is configured to compare the intensity values associated with different time-frequency regions of the plurality of time-frequency regions, to obtain individual values of the fingerprint based on the comparison of intensity values associated with two time-frequency regions, wherein the plurality of time-frequency regions are defined by a rotating kernel, rotating around a spectral bin of a time-frequency representation of the input signal.

Another embodiment may have an apparatus for providing a fingerprint of an audio signal, wherein the apparatus is configured to determine energy values for a plurality of time-frequency regions centered around the same spectral bin of a time-frequency representation of the audio signal, wherein the apparatus is configured to compare the energy values associated with different time-frequency regions of the audio signal, to obtain individual bits of the fingerprint based on the comparison of energy values associated with two time-frequency regions, wherein each bit of the fingerprint represents a result of one comparison.

According to another embodiment, an apparatus for matching an input signal with a reference signal may have: an apparatus for providing a fingerprint of an input signal, wherein the apparatus is configured to determine intensity values for a plurality of time-frequency regions of the input signal, wherein the apparatus is configured to compare the intensity values associated with different time-frequency regions of the plurality of time-frequency regions, to obtain individual values of the fingerprint based on the comparison of intensity values associated with two time-frequency regions, wherein the plurality of time-frequency regions are defined by a rotating kernel, rotating around a spectral bin of a time-frequency representation of the input signal, and an apparatus for comparing the fingerprint of the input signal with a reference fingerprint of the reference signal.

According to another embodiment, an apparatus for matching an input signal with a reference signal may have: an apparatus for providing a fingerprint of an input signal, wherein the apparatus is configured to determine energy values for a plurality of time-frequency regions centered around the same spectral bin of a time-frequency representation of the audio signal, wherein the apparatus is configured to compare the energy values associated with different time-frequency regions of the audio signal, to obtain individual bits of the fingerprint based on the comparison of energy values associated with two time-frequency regions, wherein each bit of the fingerprint represents a result of one comparison, and an apparatus for comparing the fingerprint of the input signal with a reference fingerprint of the reference signal.

Still another embodiment may have a method for providing a fingerprint of an input signal having the steps of: determining intensity values for a plurality of time-frequency regions of the input signal, comparing the intensity values associated with different time-frequency regions of the input signal, to obtain individual values of the fingerprint based on the comparison of intensity values associated with two time-frequency regions, wherein the plurality of time-frequency regions are defined by a rotating kernel, rotating around a spectral bin of a time-frequency representation of the input signal.

Another embodiment may have a method for matching an input signal with a reference signal having the steps of: providing a fingerprint of an input signal using the inventive method as mentioned above, and comparing the fingerprint of the input signal with a reference fingerprint of the reference signal.

Another embodiment may have a non-transitory digital storage medium having stored thereon a computer program for performing a method for providing a fingerprint of an input signal having the steps of: determining intensity values for a plurality of time-frequency regions of the input signal, comparing the intensity values associated with different time-frequency regions of the input signal, to obtain individual values of the fingerprint based on the comparison of intensity values associated with two time-frequency regions, wherein the plurality of time-frequency regions are defined by a rotating kernel, rotating around a spectral bin of a time-frequency representation of the input signal, when said computer program is run by a computer.

Another embodiment may have a non-transitory digital storage medium having stored thereon a computer program for performing a method for matching an input signal with a reference signal having the steps of: providing a fingerprint of an input signal using the inventive method as mentioned above, and comparing the fingerprint of the input signal with a reference fingerprint of the reference signal, when said computer program is run by a computer.

Embodiments provide an apparatus for providing a fingerprint of an input signal, wherein the apparatus is configured to determine intensity values (e.g., energy values, or loudness values, or sum of magnitude of amplitudes values) for a plurality of time-frequency regions (e.g., centered around Bark center frequencies) of the input signal, wherein the apparatus is configured to compare (e.g. using a simple binary comparison) the intensity values associated with different time-frequency regions of the plurality of time-frequency regions, to obtain individual values (e.g. bits) of the fingerprint based on the comparison of intensity values associated with two time-frequency regions (e.g., wherein each value (e.g., each bit) of the fingerprint represents a result of one comparison).

In embodiments, the plurality of time-frequency regions can overlap each other.

In embodiments, the plurality of time-frequency regions can be centered around the same frequency (e.g., the same bark center frequency) of the input signal.

In embodiments, the plurality of time-frequency regions can be centered around the same spectral bin of a time-frequency representation of the input signal.

In embodiments, the plurality of time-frequency regions can be defined by a rotating kernel (e.g., a shape, or form), rotating around a spectral bin (e.g., the same spectral bin) of a time-frequency representation of the input signal.

In embodiments, the rotating kernel can extend over at least two spectral bins of the time-frequency representation of the input signal.

In embodiments, the intensity values can be energy values.

In embodiments, the apparatus can be configured to compare the intensity values associated with different time-frequency regions of the plurality of time-frequency regions using a binary comparison.

In embodiments, each individual value of the fingerprint can be an individual bit.

In embodiments, each individual value of the fingerprint can represent a result of one comparison.

In embodiments, the plurality of time-frequency regions can be a first plurality of time-frequency regions, wherein the apparatus can be configured to determine intensity values for a second plurality of time-frequency regions of the input signal, and wherein the apparatus can be configured to compare the intensity values associated with different time-frequency regions of the second plurality of time-frequency regions, to obtain individual values of the fingerprint based on the comparison of intensity values associated with two time-frequency regions.

In embodiments, the first plurality of time-frequency regions can be centered around a first spectral bin of a time-frequency representation of the input signal, wherein the second plurality of time-frequency regions can be centered around a second spectral bin of a time-frequency representation of the input signal, and wherein the first spectral bin and the second spectral bin are different.

In embodiments, the first spectral bin and the second spectral bin can be bins of the same frame of the input signal.

In embodiments, the first spectral bin and the second spectral bin can be spaced apart from each other by a multiple of 1 Bark.

In embodiments, the input signal can be an audio signal.

Further embodiments provide an apparatus for providing a fingerprint of an audio signal, wherein the apparatus can be configured to determine energy values for a plurality of time-frequency regions centered around the same spectral bin of a time-frequency representation of the audio signal, and wherein the apparatus is configured to compare the energy values associated with different time-frequency regions of the audio signal, to obtain individual bits of the fingerprint based on the comparison of energy values associated with two time-frequency regions, wherein each bit of the fingerprint represents a result of one comparison.

Further embodiments provide a method for providing a fingerprint of an input signal. The method comprises a step of determining intensity values for a plurality of time-frequency regions of the input signal. Further, the method comprises a step of comparing the intensity values associated with different time-frequency regions of the input signal, to obtain individual values of the fingerprint based on the comparison of intensity values associated with two time-frequency regions.

Further embodiments provide a method for matching an input signal with a reference signal. The method comprises a step of determining intensity values for a plurality of time-frequency regions of the input signal. Further, the method comprises a step of comparing the intensity values associated with different time-frequency regions of the input signal, to obtain individual values of the fingerprint based on the comparison of intensity values associated with two time-frequency regions. Further, the method comprises comparing the fingerprint of the input signal with a reference fingerprint of the reference signal.

BRIEF DESCRIPTION OF THE DRAWINGS

Embodiments of the present invention are described herein making reference to the appended drawings, in which:

FIG. 6 shows a schematic block diagram of the fingerprinting algorithm that can be performed by the apparatus, according to an embodiment;

DETAILED DESCRIPTION OF THE INVENTION

Figure 1:
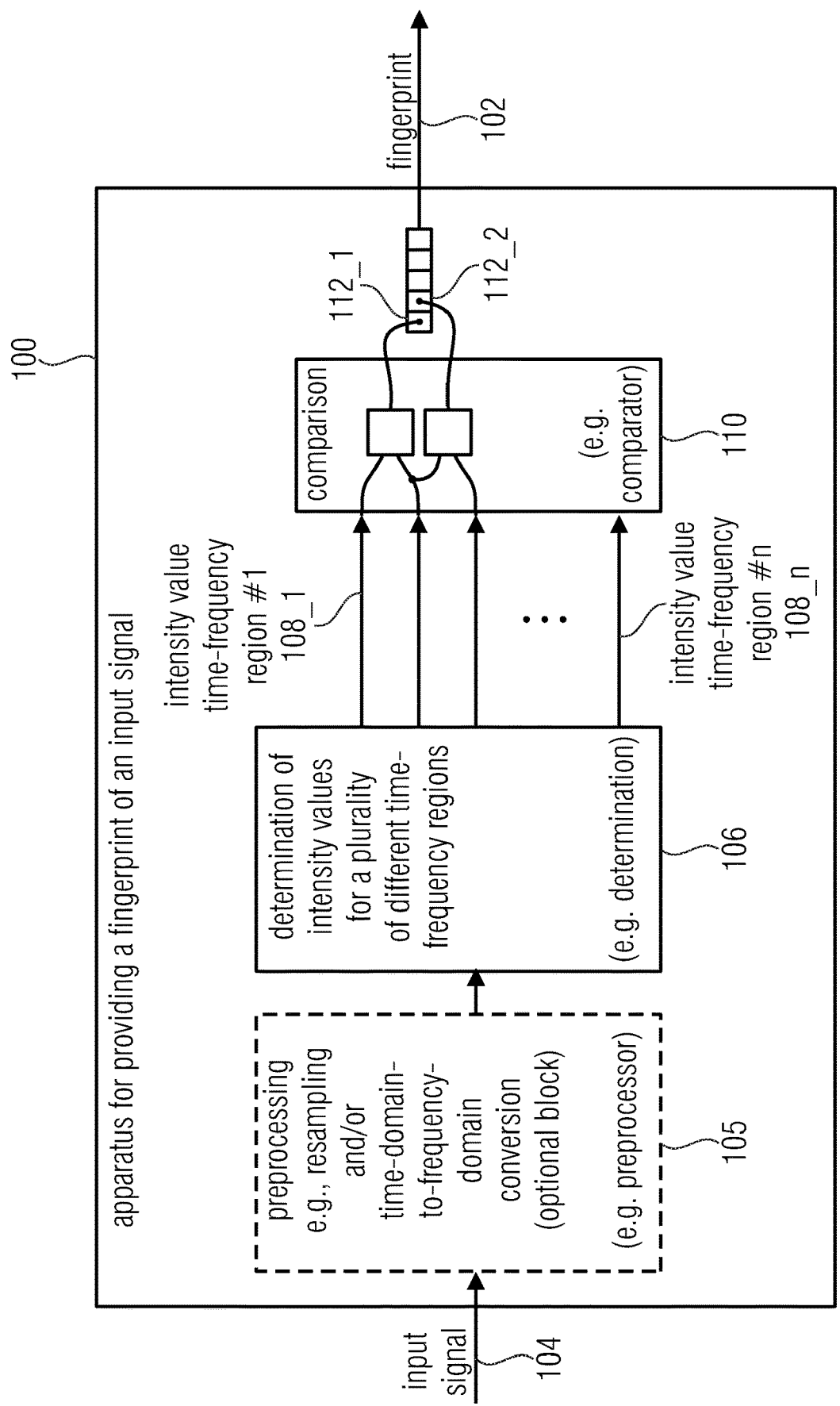
FIG. 1 shows a schematic block diagram of an apparatus for providing a fingerprint of an input signal, according to an embodiment of the present invention.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic block diagram of an apparatus 100 for providing a fingerprint 102 of an input signal 104, according to an embodiment of the present invention. The apparatus 100 comprises, for example, a determinator 106 configured to determine intensity values 108_1 to 108_n (e.g., energy or loudness or sum of magnitude of amplitudes) for a plurality of time-frequency regions (e.g., centered around Bark center frequencies) of the input signal 104. Further, the apparatus 100 comprises, for example, a comparator 110 configured to compare (e.g. using a simple binary comparison) the intensity values associated with different time-frequency regions of the plurality of time-frequency regions, to obtain individual values 112_1 and 112_2 (e.g. bits) of the fingerprint 102 based on the comparison of intensity values associated with two time-frequency regions (e.g., wherein each value 112_1 and 112_2 (e.g., each bit) of the fingerprint 102 represents a result of one comparison).

In embodiments, the plurality of time-frequency regions can be centered around the same frequency (e.g., the same bark center frequency) of the input signal 104.

In embodiments, the plurality of time-frequency regions can overlap each other. For example, the plurality of time-frequency regions can be different time-frequency regions, that overlap each other partially. Thereby, the plurality of time-frequency regions can partially overlap each other in a common (e.g., the same) time-frequency spot (e.g., defined by a frequency (or frequency sample) and time (or time sample), such as a spectral bin).

In embodiments, the apparatus 100 can optionally comprise a preprocessor 105. In embodiments, the preprocessor 105 can be configured to resample the input signal 104 in order to obtain a resampled (e.g., downsampled) version of the input signal. In embodiments, the preprocessor 105 can be configured to convert the input signal 104 (or the resampled version of the input signal) from the time-domain into the frequency-domain.

Subsequently, the functionality of the apparatus 100 for providing a fingerprint 102 of the input signal 104 is described in further detail making reference to FIG. 2.

Figure 2:
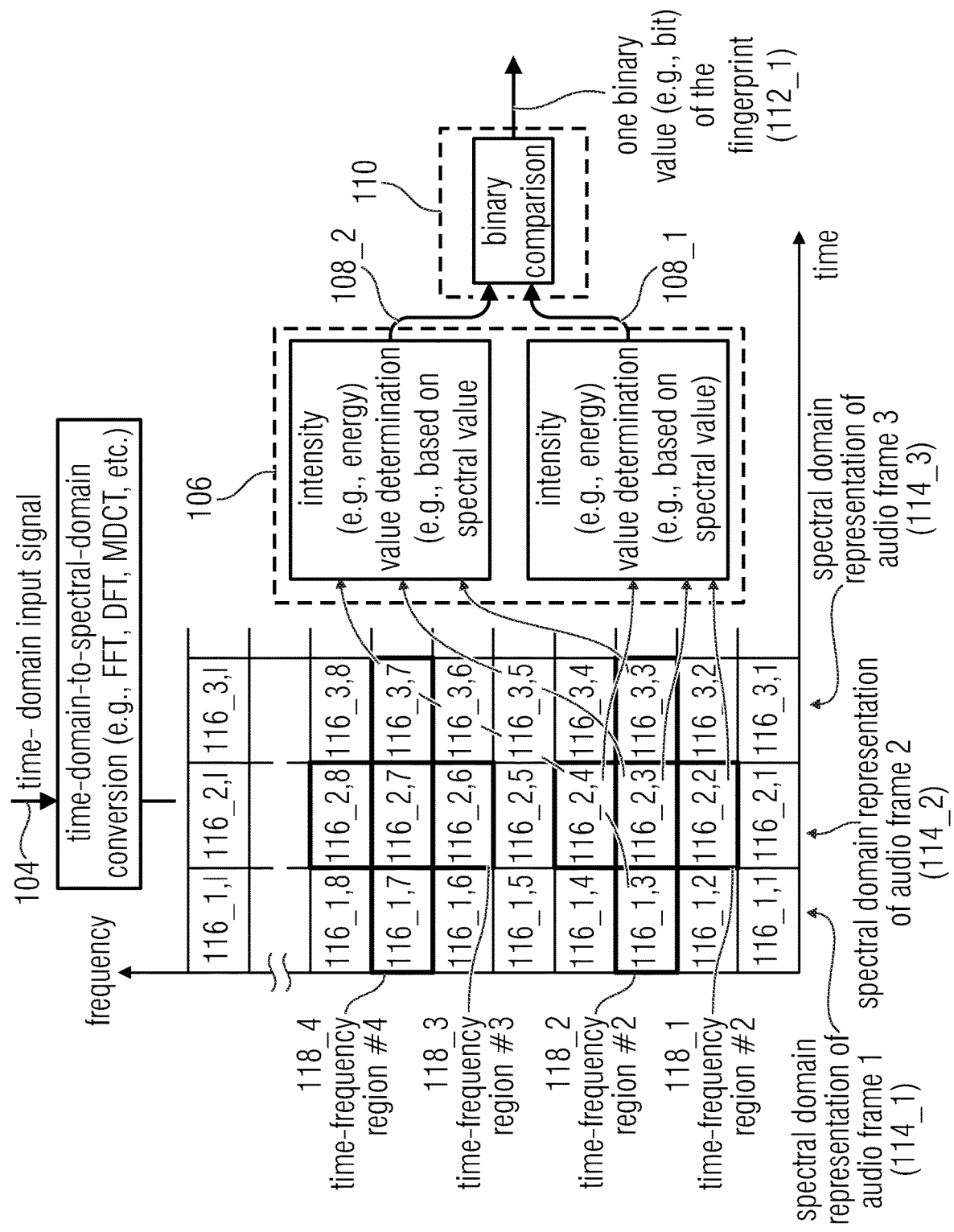
FIG. 2 shows a schematic diagram of a time-frequency representation of the input signal together with a schematic flowchart of the determination of the intensity values and the comparison of the intensity values performed by the apparatus for providing a fingerprint of the input signal.

FIG. 2 shows a schematic diagram of a time-frequency representation of the input signal 104 together with a schematic flowchart of the determination of the intensity values and the comparison of the intensity values performed by the apparatus 100 for providing a fingerprint 102 of the input signal 104.

In order to obtain the time-frequency representation of the input signal 104, the time domain input signal 104 can be converted (e.g., by the preprocessor 105) into the spectral domain (time-domain-to-spectral-domain conversion), e.g., using a FFT (fast Fourier transform), DFT (discrete Fourier transform), MDCT (modified discrete cosine transform), STFT (short-time Fourier transform), etc.

As indicated by way of example in FIG. 2, the apparatus 100 (or the preprocessor 105) can be configured to convert a plurality of audio frames (e.g., audio frame 1 (114_1), audio frame 2 (114_2) and audio frame 3 (114_3) of the time-domain input signal 104 into the spectral domain, wherein in the spectral domain each of the audio frames 114_1 and 114_2 can be represented by a plurality of spectral bins (or spectral values) 116. In detail, the first audio frame 114_1 can be represented in the spectral domain by spectral bins 116_1,1 to 116_1,I, wherein the second audio frame 114_2 can be represented in the spectral domain by bins 116_2,1 to 116_2,I, and wherein the third audio frame 114_3 can be represented in the spectral domain by bins 116_3,1 to 116_3,I.

As already mentioned, the apparatus 100 can be configured to determine intensity values (e.g., energies) for a plurality of different time-frequency regions of the input signal 104. Thereby, each time-frequency region can comprise (or define) a plurality of spectral bins 116.

As shown in FIG. 2 by way of example, the plurality of time-frequency regions can comprise a first time-frequency region 118_1 and a second time-frequency region 118_2. The first time-frequency region 118_1 comprises by way of example the spectral bins 116_2,2, 116_2,3 and 116_2,4. The second time-frequency region 118_2 comprises by way of example the spectral bins 116_1,3, 116_2,3 and 116_3,3.

In embodiments, the plurality of time-frequency regions, e.g., the first time-frequency region 118_1 and the second time-frequency region 118_2, can partially overlap each other in a common spectral bin, e.g., the spectral bin 116_2,3.

In embodiments, the first plurality of time-frequency regions, e.g., the first time-frequency region 118_1 and the second time-frequency region 118_2, can be centered around the same spectral bin (e.g., spectral bin 116_2,3) of the time-frequency representation of the input signal 104.

In embodiments, the first plurality of time-frequency regions, e.g., the first time-frequency region 118_1 and the second time-frequency region 118_2, can be defined by a rotating kernel (e.g., comprising at least two spectral bins), rotating around a spectral bin (e.g., spectral bin 116_2,3) of the time-frequency representation of the input signal 104.

For example, as shown in FIG. 2, the first time-frequency region 118_1 and the second time-frequency region 118_2 can be defined by a rotating kernel comprising an I-shape (of the size of three spectral bins by way of example) that is rotated around the spectral bin 116_2,3 in 90° steps. Naturally, the rotating kernel can also comprise any other shape, such as an L-shape, P-shape, PI-shape, E-shape or another more complex shape.

In the example shown in FIG. 2, the apparatus 100 (or the determinator 106) can be configured to determine an intensity value (e.g., energy) of a first time-frequency region 118_1 based on the spectral bins 116_2,2, 116_2,3 and 116_2,4 and to determine an intensity value (e.g., energy) of a second time-frequency region 118_2 based on the example the spectral bins 116_1,3, 116_2,3 and 116_3,3.

In embodiments, the apparatus 100 (or the comparator 110) can be configured to compare the intensity values 108_1 and 108_2 associated with different time-frequency regions of the plurality of time-frequency regions, e.g., the first time-frequency region 118_1 and the second time-frequency region 118_2, using a binary comparison, to obtain an individual value 112_1 of the fingerprint 102. Thereby, the individual value 112_1 of the fingerprint 102 represents a result of that one comparison.

In embodiments, each individual value 112_1 of the fingerprint 102 can be an individual bit.

For example, the individual value 112_1 can comprise a first binary value of one bit (e.g., "1"), if the intensity value 108_2 of the second time-frequency region 118_2 is greater than (or equal to) the intensity value 108_1 of the first time-frequency region 118_1, wherein the individual value 112_1 can comprise a second binary value of one bit (e.g., "0"), if the intensity value 108_2 of the second time-frequency region 118_2 is smaller than the intensity value 108_1 of the first time-frequency region 118_1.

In embodiments, the apparatus 100 can be configured to determine intensity values for a second plurality of time-frequency regions of the input signal.

As shown in FIG. 2 by way of example, the second plurality of time-frequency regions can comprise a third time-frequency region 118_3 and a fourth time-frequency region 118_4. The third time-frequency region 118_3 comprises by way of example the spectral bins 116_2,6, 116_2,7 and 116_2,8. The fourth time-frequency region 118_4 comprises by way of example the spectral bins 116_1,7, 116_2,7 and 116_3,7.

In embodiments, the second plurality of time-frequency regions, e.g., the third time-frequency region 118_3 and the fourth time-frequency region 118_4, can be centered around the same spectral bin (e.g., spectral bin 116_2,7) of the time-frequency representation of the input signal 104.

Thereby, the first plurality of time frequency regions (e.g., the first time-frequency region 118_1 and the second time-frequency region 118_2) and the second plurality of time frequency regions (e.g., the third time-frequency region 118_3 and the fourth time-frequency region 118_4) can be centered around different spectral bins, i.e. a first spectral bin (e.g., spectral bin 116_2,3) and a second spectral bin (e.g., spectral bin 116_2,7) that are different from each other.

In embodiments, the first spectral bin (e.g., spectral bin 116_2,3) and the second spectral bin (e.g., spectral bin 116_2,7) can be bins of the same frame (e.g., frame 114_2) of the input signal 104.

In embodiments, the first spectral bin (e.g., spectral bin 116_2,3) and the second spectral bin (e.g., spectral bin 116_2,7) can be separated from each other by 1 Bark or an integer multiple thereof.

In embodiments, the apparatus 100 can be configured to compare the intensity values associated with different time-frequency regions of the second plurality of time-frequency regions, e.g., the third time-frequency region 118_3 and the fourth time-frequency region 118_4 (e.g., using a binary comparison), to obtain individual values of the fingerprint 102 based on the comparison of intensity values associated with two time-frequency regions.

Figure 3:
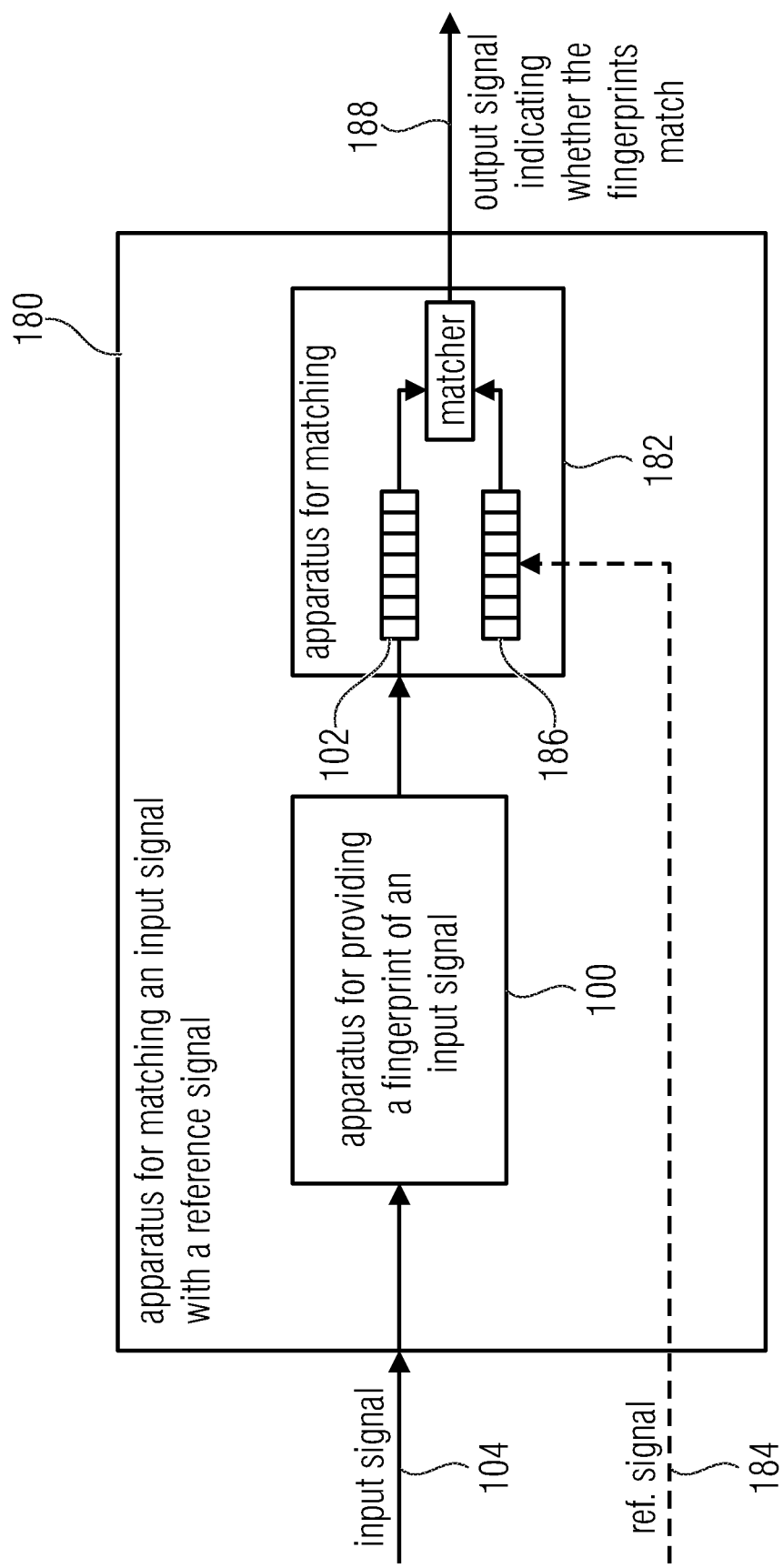
FIG. 3 shows a block diagram of an apparatus for matching an input signal with a reference signal, according to an embodiment.

FIG. 3 shows a block diagram of an apparatus 180 for matching an input signal 104 with a reference signal 184, according to an embodiment. The apparatus 180 for matching the input signal 104 with a reference signal 184 comprises the apparatus 100 for providing the fingerprint 102 of the input signal 104 shown in FIG. 2 and described above, and an apparatus 182 for comparing the fingerprint 102 of the input signal 104 with a reference fingerprint 186 of the reference signal 184.

In embodiments, the apparatus 182 can be configured to determine the fingerprint 186 of the reference signal 184, for example, analog to the determination of the fingerprint 102 of the input signal 104 by apparatus 100.

In embodiments, the apparatus 182 can also be configured to hold (e.g., in a memory) the fingerprint 186 of the reference signal 184.

In embodiments, the apparatus 182 can be configured to provide an output signal 188 indicating whether the fingerprint 102 of the input signal 104 matches the reference fingerprint 186 of the reference signal 184.

Subsequently, further embodiments of the apparatus 100 for providing the fingerprint 102 of the input signal 104 and/or of the apparatus 180 for matching the input signal 104 with a reference signal 184 are described.

The main characteristic of the matching system described herein are its robustness to noise and interfering signals. This means that a given query signal (or input signal 104) can be matched to its corresponding reference (or reference signal 184) even under noisy conditions. To guarantee robustness to interference and noise, the matching system completely avoids peak picking in the magnitude spectrogram and relies entirely on intensity (e.g., energy) relationships in predefined frequency bands, e.g., at the Bark center frequencies. Avoiding peak picking for fingerprint extraction also makes this approach suitable for non-musical audio signals such as speech, environmental noises, and mixed signals.

In embodiments, the fingerprint 102 is based on the use of a rotating kernel centered in pre-defined frequency locations—center frequencies. For each center frequency, a rotation of the kernel defines a time-frequency region (e.g., time-frequency regions 118_1 and 118_2 in FIG. 2) in the spectrogram in which the intensity (e.g., energy) can be calculated. A series of comparisons between the intensities (e.g., energies) of these regions can be made, each one representing a bit of the fingerprint 102. The kernel rotation and the energy comparisons can be performed in every pre-defined center frequency and in every time frame.

In embodiments, given that only intensity value (e.g., energy) comparisons are performed, the resulting fingerprint 102 can be in binary format: If the intensity value (e.g., energy value) of a given time-frequency region is larger than that of another given time-frequency region, this particular bit of the fingerprint will be set, for example, to one. Otherwise, the bit will be set, for example, to zero. Having a binary fingerprint 102 not only results in low memory requirements but also in efficient and simple matching strategies against the reference fingerprints—distance measures such as the Hamming distance can be used.

Embodiments provide a fingerprinting approach that is extremely flexible in terms of the number of intensity (e.g., energy) comparisons used for matching: if more intensity (e.g., energy) comparisons are used, better performance and increased robustness can be achieved; if less intensity (e.g., energy) comparisons are used, more efficient matching can be achieved. This strategy allows the definition of coarse searches with reduced number of comparisons that can efficiently detect matching candidates. It also allows defining refined searches that can detect possible false positives within the matching candidates.

Embodiments are suitable for several use-cases, as will become clear from the below description, which mentions some of the possible use-cases by way of example.

A first exemplary use-case is live matching. This use-case refers to those applications where live broadcasts or signals such as radio stations or TV channels are monitored in real-time. In this case, fingerprints of the original TV and radio broadcasts are extracted as references. Query signals are recorded with time-stamps that indicate the exact moment the signals were captured. For the matching procedure, the search for matches is only performed in the time region determined by the time-stamp and a given tolerance.

A second exemplary use-case is time-shift matching. This use-case refers to applications where broadcasts are monitored over a longer period of time that can span days, weeks or even months. This use-case mainly covers monitoring applications of internet radio and TV, as well as video on demand services. This use-case has stronger demands in terms of memory as reference fingerprints need to be stored for a longer time period (days, weeks or months). It is also a more demanding application in terms of matching efficiency, given that a single query has to be matched with references from the entire time span of the monitoring task.

A second exemplary use-case is matching against a fixed reference dataset. There are certain applications where the matching is performed against a fixed dataset of reference signals. This is the case for example of add monitoring in radio and TV broadcasts. Having a fixed collection of reference signals allows more efficient matching as hashing strategies can be easily applied.

Embodiments described herein have the advantage of an efficient matching. Due to the use of binary fingerprints, the Hamming distance can be used as an efficient distance measure between fingerprints.

Embodiments described herein have the advantage of reduced memory requirements. Given that the extracted fingerprints are binary, memory requirements are kept low.

Embodiments described herein have the advantage of robustness to noise. For example, the system can find matches with signal-to-noise-ratio (SNR) up to −15 dB.

Embodiments described herein have the advantage of robustness against signal distortions, such as echoes, muffled microphones, reflections, equalization, un-tuned receivers, time drifts up 150 ms/minute, jitter up to +/−20 ms, compression up to 10%, and/or expansion up to 10%.

Embodiments described herein have the advantage that they work with audio signals of all types like speech, music, mixed signals, environmental sounds and noises. Additionally, embodiments also work with other input signals (i.e. non-audio input signals), in other words, embodiments work not only with audio signals bur rather with any time-domain input signal.

Embodiments described herein have the advantage of robustness to low bitrate audio coding, such as 128 kbps, 80 kbps and 48 kbps.

Embodiments described herein can be applied, for example, in at least one of the following areas: (1) processing and post-processing tools for broadcasters, (2) broadcast or streaming monitoring, (3) digital archives—duplicate detection, (4) content reuse, (5) copyright royalties monitoring—collection agencies, (6) audience measurement—Radio/TV, (7) sampling plagiarism detection, (8) structure analysis of a TV/Radio program, (9) audio forensics, and (10) processing and management of user generated content.

Figure 4:
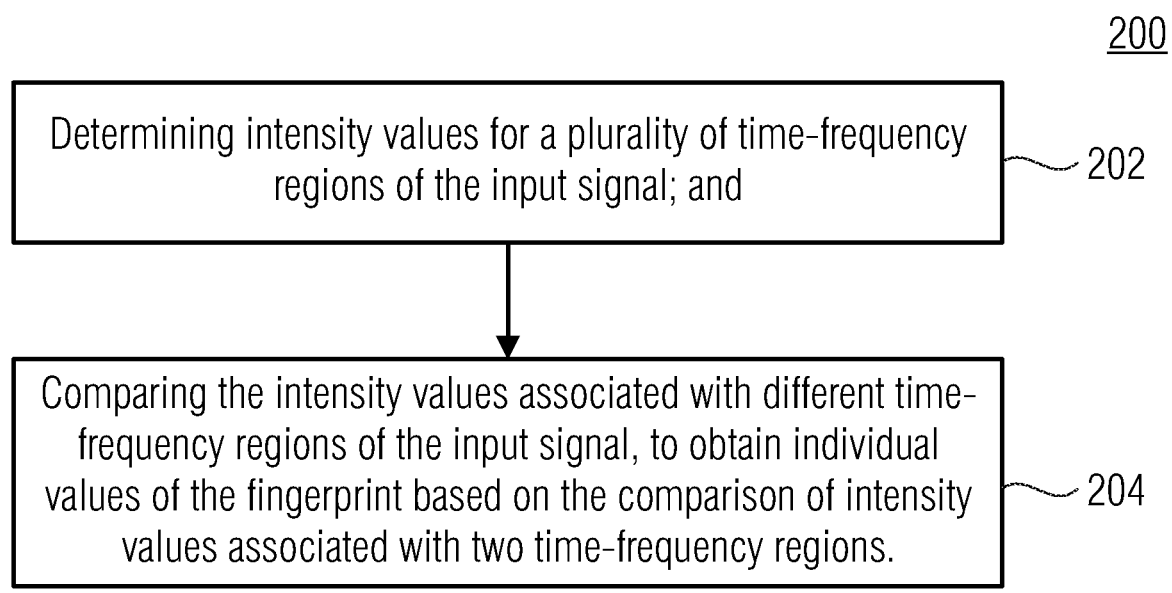
FIG. 4 shows a flowchart of a method for providing a fingerprint of an input signal, according to an embodiment.

FIG. 4 shows a flowchart of a method 200 for providing a fingerprint of an input signal, according to an embodiment. The method 200 comprises a step of determining intensity values for a plurality of time-frequency regions of the input signal. Further, the method 200 comprises a step 204 of comparing the intensity values associated with different time-frequency regions of the input signal, to obtain individual values of the fingerprint based on the comparison of intensity values associated with two time-frequency regions.

Figure 5:
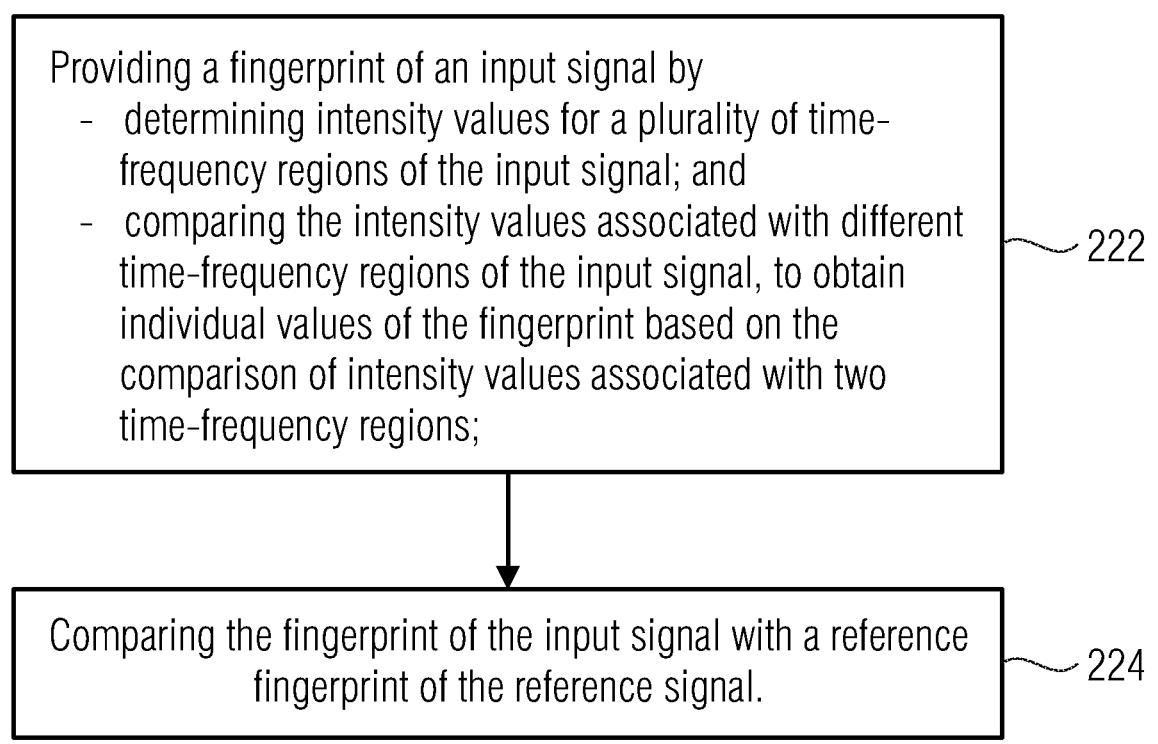
FIG. 5 shows a flowchart of a method for matching an input signal with a reference signal, according to an embodiment.

FIG. 5 shows a flowchart of a method 220 for matching an input signal with a reference signal, according to an embodiment. The method 220 comprises a step 222 of providing a fingerprint of an input using the method of FIG. 4. Further, the method 220 comprises a step 224 of comparing the fingerprint of the input signal with a reference fingerprint of the reference signal.

In the following, an exemplary implementation of the apparatus 100 for providing the fingerprint 102 of the input signal 104 is described. Thereby, it is exemplarily assumed that the apparatus 100 is a portable fingerprinting meter (e.g., comprising a microprocessor or computer) configured to perform the fingerprint algorithm described herein. As already indicated above, the fingerprinting algorithm is based on mapping energy relationships of the magnitude spectrogram in a binary form. The fingerprinting approach is performed (e.g., entirely) in the frequency domain.

FIG. 6 shows a schematic block diagram of the fingerprinting algorithm that can be performed by the apparatus 100. As shown in FIG. 6 the preprocessor 105 (see FIG. 2) can be implemented by a resampling block 130 and a STFT block 132, wherein both, the determinator 106 and the comparator 110 (see FIG. 2) can be implemented in the fingerprint calculation block 134.

In the diagram of FIG. 5, input, output and intermediate signals are indicated by reference numerals 102, 104, 122 and 124, wherein the input parameters to each of the processing blocks 130, 132 and 134 are indicated by reference numerals 126, 128, 130 and 132.

The audio signal (audioIn) 104 is the initial input to the apparatus 100. In the resampling block 130, the audio signal (audioIn) 104 can be downsampled to the target sampling frequency (targetFs). After this step, a new audio signal (audioFs) 122 with a lower sampling rate is created. The audio signal 122 can be taken to the frequency domain by means of the Short-Time Fourier Transform in the STFT block 132. This block 132 takes N 128 and Hop 130 as input parameters. The resulting magnitude spectrogram (magSpec) 124 is then passed to the fingerprint calculation block 134 which takes the Bark center frequency bins (barkBins) 132 as input parameter. Finally, the resulting fingerprint (FP) 102 is the output of the apparatus 100.

Subsequently, each of the processing blocks 130, 132 and 134 will be independently explained in further detail.

First, the resampling block 130 is described in further detail.

In order to reduce computational power needed to run the fingerprinting algorithm, the input audio signal 104, most frequently sampled at 44.1 kHz, can be downsampled to the target sampling frequency given by the input parameter (targetFs) 126. Tests conducted with the algorithm have shown that performance is not affected by the downsampling process, being 8 kHz the lowest target frequency (targetFs) 126 tested.

Second, the STFT block 132 is described in further detail.

In this block, the time-domain audio signal 122 is transformed to the frequency domain by means of the Short-time Fourier transform. All the fingerprint extraction process can be calculated in the frequency domain. Two input parameters are given to STFT block 132, i.e. the parameter N 128 and the parameter Hop 130. The parameter N 128 refers to the window size of the Fourier transform, wherein the parameter Hop 130 refers to the number of samples skipped between two consecutive FFT calculations. These two parameters influence efficiency and computational requirements in the fingerprinting algorithm. While a shorter FFT is faster to calculate and less memory is used for its temporal storage, more FFTs need to be calculated to cover the whole audio signal. With regards to the hop size, while smaller hop sizes give better time resolution to the algorithm, it also increases the amount of FFTs needed to cover the audio signal.

The STFT block 132 may obtain both, the magnitude spectrogram 124 and a phase spectrogram. Since only the magnitude spectrogram 124 obtained in the STFT block is used for the fingerprint calculation, the magnitude spectrogram (magSpec) 124 is passed to the fingerprint calculation block 134, while the phase spectrogram can be discarded.

Third, the fingerprint calculation block 134 is described in further detail.

The magnitude spectrogram (magSpec) 124 and the input parameter (barkBins) 132 are the starting point of the fingerprint calculation block 134. The fingerprinting approach is entirely based on energy relationships between different regions of the magnitude spectrogram. In each time frame, a series of energy comparison are made and encoded in a binary fingerprint. In order to reduce the number of comparisons made and to avoid peak picking strategies that can be error-prone, the energy comparisons are only performed in a number of frequency bins in the magnitude spectrogram. To make a meaningful selection of the frequency bins in which the energy comparisons are performed, the center frequencies of the Bark scale where selected. As originally proposed, the center frequencies of the Bark scale are as follows: 60, 150, 250, 350, 450, 570, 700, 840, 1000, 1170, 1370, 1600, 1850, 2150, 2500, 2900, 3400, 4000, 4800, 5800, 7000, 8500, 10500 and 13500 Hz. In an exemplary implementation, only frequencies between, for example, 250 and targetFs/2 can be used.

Subsequently, energy regions and comparisons are described. For example, a T-shaped binary kernel can be chosen to define different energy regions where the energies are calculated and compared. For example, two versions of the T-shaped kernel can be used for fingerprint extraction as shown in FIGS. 7a and 7b.

Figure 7B:
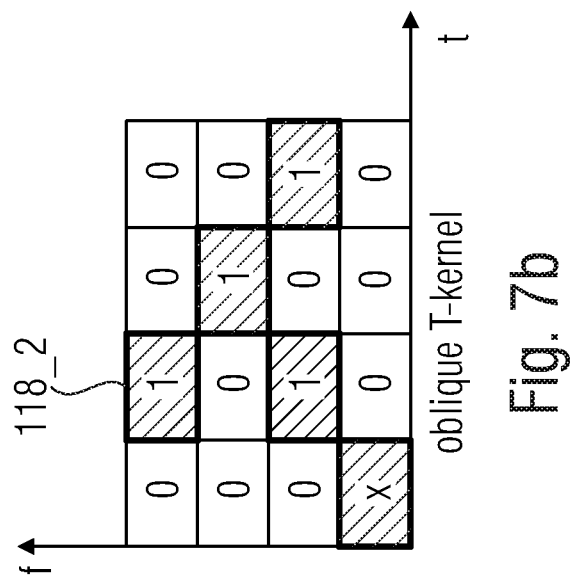
FIGS. 7a-b show schematic diagrams of portions of the magnitude spectrogram of the input signal and of T-kernels defining time-frequency regions of the magnitude spectrogram for fingerprint extraction.
Figure 7A:
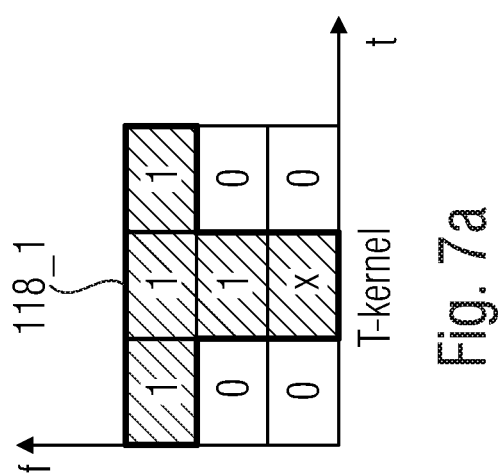

In detail, FIGS. 7a and 7b show schematic diagrams of portions of the magnitude spectrogram 124 of the input signal and of T-kernels 118_1 and 118_2 defining time-frequency regions of the magnitude spectrogram for fingerprint extraction. For each of the Bark center frequencies in the allowed frequency range, a total of, for example, 8 kernel convolutions can be performed. The lower end of the T-kernels (marked with an x in FIGS. 7a and 7b) can be (always) centered in each Bark frequency. The underlying idea behind the processing is a circular convolution.

The kernel can be centered on a given Bark frequency, the convolution can be performed and the kernel can be then rotated in a clock-wise direction. A new convolution is performed followed by a new kernel rotation.

Figures 8A, 8B, 8C:
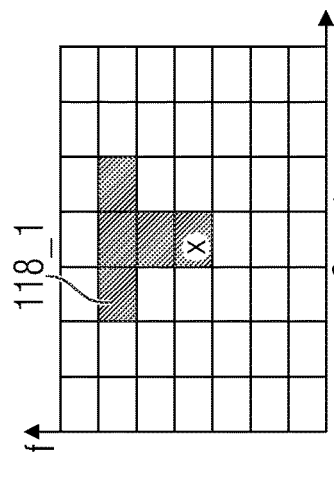
FIGS. 8a-i show schematic diagrams of portions of the magnitude spectrogram 124 of the input signal and 8 different time-frequency regions 118_1 to 118_8 defined by a T-kernel rotating around the same frequency bin.
Figures 8D, 8E, 8F:
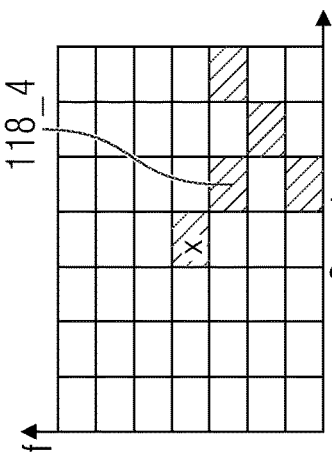
Figures 8G, 8H, 8I:
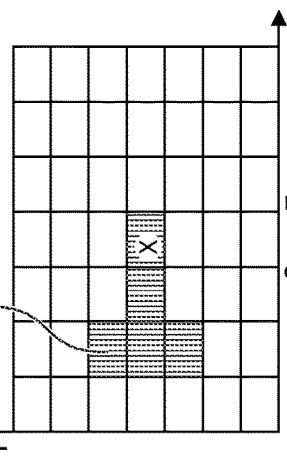

FIGS. 8a to 8i show schematic diagrams of portions of the magnitude spectrogram 124 of the input signal and 8 different time-frequency regions 118_1 to 118_8 defined by a T-kernel rotating around the same frequency bin. In other words, FIGS. 8a to 8i show the circular convolution in a schematic manner. Each grid represents time-frequency bins of the magnitude spectrogram. The bins marked with an x represent Bark center frequencies, in this case always shown in the center of the grid. A schematic for each of the 8 convolutions performed is presented. The diagram of FIG. 8i summarizes the whole circular convolution process.

After performing the convolutions, a series of energy comparisons are performed. If any of the following conditions is met, the given fingerprint bit is set to 1; otherwise the bit is set to 0. The following table describes the set of comparisons performed:

| Number | Comparison | Binary value |
| --- | --- | --- |
| 1 | If conv1 > conv2 | 1 |
| 2 | If conv1 > conv8 | 1 |
| 3 | If conv1 > conv5 | 1 |
| 4 | If conv2 > conv3 | 1 |
| 5 | If conv2 > conv6 | 1 |
| 6 | If conv3 > conv4 | 1 |
| 7 | If conv3 > conv7 | 1 |
| 8 | If conv4 > conv5 | 1 |
| 9 | If conv4 > conv8 | 1 |
| 10 | If conv5 > conv6 | 1 |
| 11 | If conv6 > conv7 | 1 |
| 12 | If conv8 > conv7 | 1 |

Two additional energy comparisons can be made which instead of using the T-kernels, simply compare the energy of the center frequency with respect to two of its neighbors. Assuming the center frequency is located in bin k and time frame n of the power spectrogram, S(k,n), the two additional comparisons can be:

| Number | Comparison | Binary value |
| --- | --- | --- |
| 13 | If S(k, n) > S(k, n − 1) | 1 |
| 14 | If S(k, n) > S(k − 1, n) | 1 |

The final fingerprint is composed of a binary matrix calculated on a frame by frame basis. For each Bark bin, a 14-bit binary vector can be calculated. For a given target sampling frequency (targetFs) of, for example, 8000 Hz, the algorithm produces a 15×14 binary matrix per frame.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF REFERENCES

[1] Wang, A. L.-C., "An industrial-strength audio search algorithm," 2003. In *Proceedings of the 4th International Society for Music Information Retrieval Conference (IS-MIR)*.
[2] Anguera, X., Garzón, A., and Adamek, T., "MASK: Robust Local Features for Audio Fingerprinting," 2012. In *IEEE International Conference on Multimedia and Expo*.
[3] Sonnleitner, R. and Widmer, G., "Quad-based Audio Fingerprinting Robust to Time and Frequency Scaling," 2014. In *Proceedings of the 17th International Conference on Digital Audio Effects (DAFx-14)*. Erlangen, Germany.
[4] Bilobrov, S. and Khadkevich, M. "Detecting distorted audio signalsbased on audio fingerprinting," US20150199974 A1.
[5] Haitsma, J. and Kalker, T., "A Highly Robust Audio Fingerprinting System," 2002. In *Proceedings of the 3rd International Society for Music Information Retrieval Conference (ISMIR)*. Paris, France
[6] Shumeet, B. and Covell, M., "Audio Fingerprinting: Combining computer vision and data-stream processing," 2007. In *Proceedings of the IEEE International Conference on Acoustics, Speech and Signal Processing (ICASSP)*.

The invention claimed is:

1. An apparatus for providing a fingerprint of an input signal,
wherein the apparatus is configured to determine intensity values for a plurality of time-frequency regions of the input signal,
wherein the apparatus is configured to compare the intensity values associated with different time-frequency regions of the plurality of time-frequency regions, to acquire individual values of the fingerprint based on the comparison of intensity values associated with two time-frequency regions,
wherein the plurality of time-frequency regions are defined by a rotating kernel, rotating around a spectral bin of a time-frequency representation of the input signal,
wherein the rotating kernel extends over at least two spectral bins of the time-frequency representation of the input signal.

2. The apparatus according to claim 1,
wherein the plurality of time-frequency regions c overlap each other.

3. The apparatus according to claim 1,
wherein the plurality of time-frequency regions are centered around the same frequency of the input signal.

4. The apparatus according to claim 1,
wherein the plurality of time-frequency regions are centered around the same spectral bin of a time-frequency representation of the input signal.

5. The apparatus according to claim 1,
wherein the intensity values are energy values.

6. The apparatus according to claim 1,
wherein the apparatus is configured to compare the intensity values associated with different time-frequency regions of the plurality of time-frequency regions using a binary comparison.

7. The apparatus according to claim 1,
wherein each individual value of the fingerprint is an individual bit.

8. The apparatus according to claim 1,
wherein each individual value of the fingerprint represents a result of one comparison.

9. The apparatus according to claim 1,
wherein the plurality of time-frequency regions are a first plurality of time-frequency regions,
wherein the apparatus is configured to determine intensity values for a second plurality of time-frequency regions of the input signal,
wherein the apparatus is configured to compare the intensity values associated with different time-frequency regions of the second plurality of time-frequency regions, to acquire individual values of the fingerprint based on the comparison of intensity values associated with two time-frequency regions.

10. The apparatus according to claim 9,
wherein the first plurality of time-frequency regions are centered around a first spectral bin of a time-frequency representation of the input signal,
wherein the second plurality of time-frequency regions are centered around a second spectral bin of a time-frequency representation of the input signal,
wherein the first spectral bin and the second spectral bin are different.

11. The apparatus according to claim 10,
wherein the first spectral bin and the second spectral bin are bins of the same frame of the input signal.

12. The apparatus according to claim 10,
wherein the first spectral bin and the second spectral bin are spaced apart from each other by a 1 Bark or an integer multiple thereof.

13. The apparatus according to claim 1,
wherein the input signal is an audio signal.

14. An apparatus for matching an input signal with a reference signal, comprising
an apparatus for providing a fingerprint of an input signal,
wherein the apparatus is configured to determine intensity values for a plurality of time-frequency regions of the input signal,
wherein the apparatus is configured to compare the intensity values associated with different time-frequency regions of the plurality of time-frequency regions, to acquire individual values of the fingerprint based on the comparison of intensity values associated with two time-frequency regions,
wherein the plurality of time-frequency regions are defined by a rotating kernel, rotating around a spectral bin of a time-frequency representation of the input signal, and
an apparatus for comparing the fingerprint of the input signal with a reference fingerprint of the reference signal.

15. A method for providing a fingerprint of an input signal, comprising
determining intensity values for a plurality of time-frequency regions of the input signal,
comparing the intensity values associated with different time-frequency regions of the input signal, to acquire individual values of the fingerprint based on the comparison of intensity values associated with two time-frequency regions,
wherein the plurality of time-frequency regions are defined by a rotating kernel, rotating around a spectral bin of a time-frequency representation of the input signal,
wherein the rotating kernel extends over at least two spectral bins of the time-frequency representation of the input signal.

16. A method for matching an input signal with a reference signal, comprising
providing a fingerprint of an input signal using the method of claim 15, and
comparing the fingerprint of the input signal with a reference fingerprint of the reference signal.

17. A non-transitory digital storage medium having stored thereon a computer program for performing a method for matching an input signal with a reference signal, comprising
providing a fingerprint of an input signal using the method of claim 15, and
comparing the fingerprint of the input signal with a reference fingerprint of the reference signal,
when said computer program is run by a computer.

18. A non-transitory digital storage medium having stored thereon a computer program for performing a method for providing a fingerprint of an input signal, comprising
determining intensity values for a plurality of time-frequency regions of the input signal,
comparing the intensity values associated with different time-frequency regions of the input signal, to acquire individual values of the fingerprint based on the comparison of intensity values associated with two time-frequency regions,
wherein the plurality of time-frequency regions are defined by a rotating kernel, rotating around a spectral bin of a time-frequency representation of the input signal,
wherein the rotating kernel extends over at least two spectral bins of the time-frequency representation of the input signal,
when said computer program is run by a computer.

* * * * *